Figure 1:
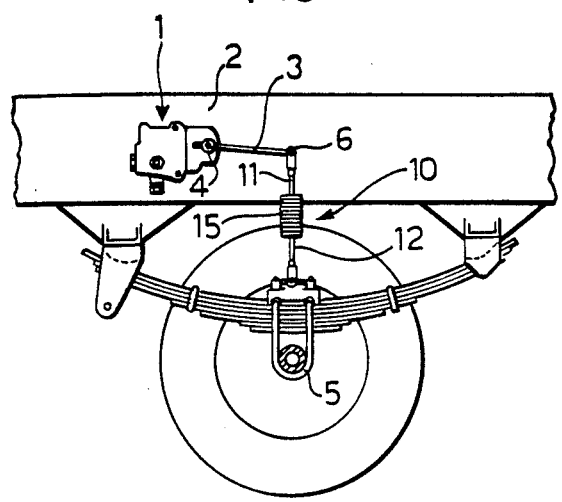

United States Patent [19]

Giovanni

[11] Patent Number: 4,869,473
[45] Date of Patent: Sep. 26, 1989

[54] RESILIENT DEVICE FOR CONNECTION BETWEEN TWO STRUCTURAL ELEMENTS, PARTICULARLY FOR CONNECTING THE CONTROL SHAFT OF A BRAKING MODULATOR TO AN AXLE OF A MOTOR VEHICLE

[75] Inventor: Sesto S. Giovanni, Milan, Italy

[73] Assignee: Industrie Magneti marelli S.r.l., Milan, Italy

[21] Appl. No.: 210,481

[22] Filed: Jun. 23, 1988

[30] Foreign Application Priority Data

Jun. 23, 1987 [IT] Italy .............................. 67541 A/87

[51] Int. Cl.⁴ .............................................. F16F 1/06
[52] U.S. Cl. ...................................... 267/74; 267/169; 267/170; 267/179
[58] Field of Search ................... 267/74, 73, 169, 170, 267/179, 4, 69; 213/40 R, 42

[56] References Cited

U.S. PATENT DOCUMENTS

| | | | |
|---|---|---|---|
| 756,175 | 3/1904 | Meisselbach et al. ............. | 267/24 X |
| 1,062,312 | 5/1913 | Watson ............................ | 267/169 X |
| 1,189,963 | 7/1916 | Jones ..................................... | 267/74 |
| 1,237,758 | 8/1917 | Courson ................................ | 213/42 |
| 1,317,788 | 10/1919 | Hinsdale ............................. | 267/170 |
| 4,225,123 | 9/1980 | Hefren ............................. | 267/169 X |
| 4,385,754 | 5/1983 | Waite ..................................... | 267/71 |

Primary Examiner—George E. A. Halvosa
Attorney, Agent, or Firm—Sughrue, Mion, Zinn, Macpeak & Seas

[57] ABSTRACT

The device comprises two rods which are each intended to be connected to one of the structural elements, and at least one helical spring whose ends are connected to two discs, each associated with one of the rods, so as to oppose the movement apart of the rods through the discs. The latter are mounted for axial sliding relative to the associated discs and are formed in such a way that their movement both towards and away from each other causes tensioning of the spring from its undeformed rest condition. The device acts as a rigid connecting element when the stresses applied to it are less than a predetermined threshold. When the stress exceeds the threshold, however, it deforms resiliently to limit the amount of stress transmitted to the members between which it is connected.

2 Claims, 2 Drawing Sheets

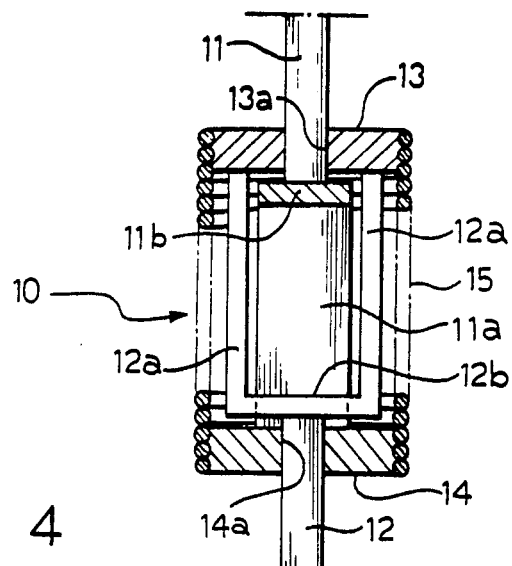
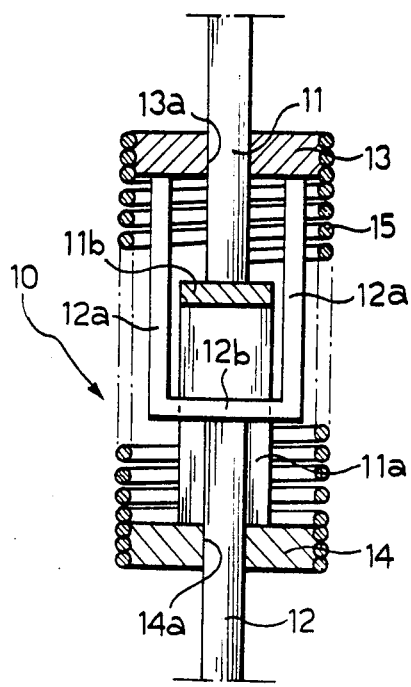
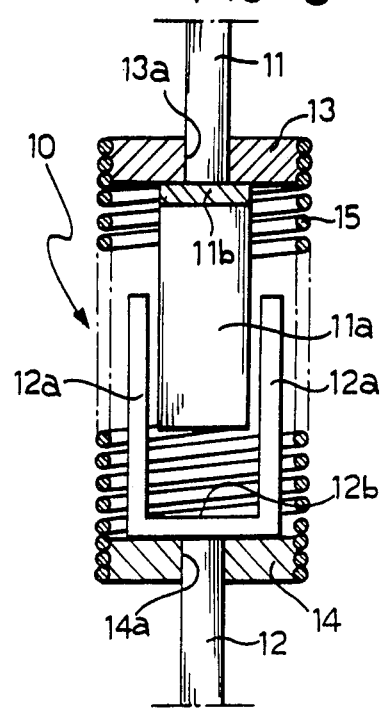

RESILIENT DEVICE FOR CONNECTION BETWEEN TWO STRUCTURAL ELEMENTS, PARTICULARLY FOR CONNECTING THE CONTROL SHAFT OF A BRAKING MODULATOR TO AN AXLE OF A MOTOR VEHICLE

The present invention relates to a resilient device for connection between two structural elements, particularly (but not exclusively) for connecting the control shaft of a braking modulator or corrector to an axle of a motor vehicle.

More specifically, the invention relates to a resilient connecting device comprising:

two rods which are each intended to be connected to one of the structural elements, in particular, to the shaft of a braking modulator and to an axle respectively, two discs, each associated with one of the rods, and at least one resilient member whose ends are connected to the discs so as to oppose the movement apart of the rods through the discs;

the rods, the discs and the resilient member forming an assembly adapted to act as a rigid connection when the stresses applied to it are less than a predetermined threshold, and to deform resiliently when the stresses exceed the threshold, so as to limit the amount of stress transmitted between the structural elements.

In a connecting device of the above-specified type produced according to the prior art, the discs are constituted by end heads of the rods and the resilient member is constituted by a very stiff helical spring whose ends are anchored to the discs.

For applications in which the known connecting device must also enable the absorption of a compressive force, the coils of the spring must be spaced apart in the rest condition. However, this detracts from the stiffness of the device.

The object of the present invention is to produce a resilient connecting device of the type defined above, which is very stiff but which is nevertheless able to absorb stresses both in tension and in compression.

These and other objects are achieved according to the invention by means of a device of the above-specified type, the main characteristic of which lies in the fact that the rods are mounted for axial sliding relative to the discs and are provided with respective first reaction means adapted to cause the discs to move apart when the rods move towards each other, and with respective second reaction means adapted to cause the discs to move apart when the rods move apart, so that the movement of the rods both towards and away from each other causes tensioning of the resilient member from its undeformed rest condition.

In the device according to the invention, the resilient member is also conveniently constituted by a helical spring whose ends are anchored to the discs: this spring can be made in such a way that its coils are close together in the undeformed rest condition, since both tensile stresses and compressive stresses of the device are translated into a tensioning action applied to this spring.

Figure 2:
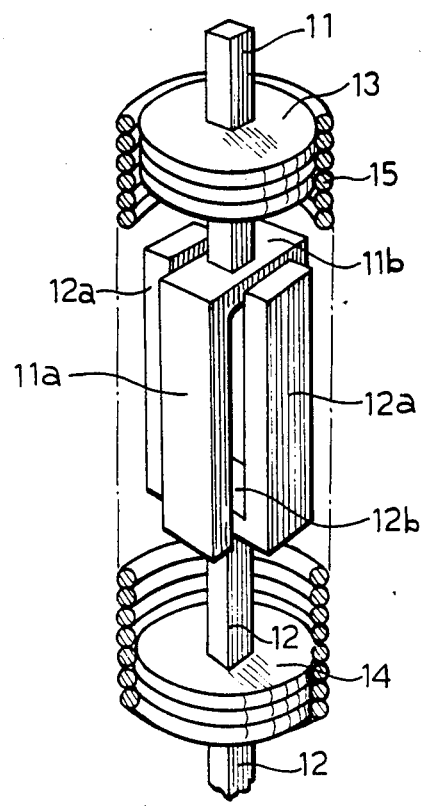

Further characteristics and advantages of the deivce according to the invention will be come clear from the detailed description which follows with reference to the appended drawings, provided purely by was of non-limiting example, in which:

FIG. 1 shows a resilient connecting device according to the present invention interposed between the control shaft of a braking modulator or corrector and an axle of a motor vehicle, FIG. 2 is a partially-sectioned and exploded perspective view of a device according to the invention, FIG. 3 is an axial section of the device according to the invention in its undeformed rest condition, and FIGS. 4 and 5 are views similar to that of FIG. 3, showing the device according to the invention in two deformed conditions, under the action of compressive and tensile forces respectively.

In FIG. 1, a braking corrector or modulator device of known type is generally indicated 1 and is fixed to the body or suspended structure 2 of a motor vehicle. This device comprises, also in known manner, a control shaft 3 pivoted at 4 about an axis passing through the body of the braking corrector 1 and articulated at 6 to a resilient connecting device 10 which is in turn connected to the axle 5 (for example, the rear axle) of the motor vehicle.

As can be seen particularly from FIG. 2, a connecting device 10 according to the present invention comprises two aligned rods 11, 12 of which the first is connected to the control shaft 3 of the braking corrector and the second is connected to the axle 5 of the motor vehicle. In the embodiment illustrated, these rods have prismatic sections and extend through central apertures 12a 14a and in discs 13 and 14. These discs have a series of lateral channels in which the end coils of a very stiff helical spring 15 are anchored.

Within the spring 15, the end portions of the rods 11 and 12 are shaped like interpenetrating forks, with their prongs 11a and 12a facing downwardly and upwardly respectively.

In FIG. 3, the connecting device according to the invention is shown in the rest condition. In this condition, the yokes 11b and 12b face each other and are spaced apart and, moreover, the ends of the prongs of the forked portion of each rod and the yoke of the forked portion of the other rod press against the disc 13 and against the disc 14 respectively. In this situation, the spring 15 is relieved.

As stated, the spring 15 is preferably very stiff. Consequently, in use, the connecting device 10 as a whole behaves like a substantially rigid connecting element as long as the stresses applied to it are below a predetermined threshold. When the stresses exceed the threshold, however, it deforms resiliently in order to limit the amount of stress it transmits between the structural elements between which it is interposed and, in particular, in the example of FIG. 1, to limit the stresses transmitted, for example, from the axle 5 to the control shaft 3 of the braking correcter.

FIG. 4 shows the deformed condition of the connecting element according to the invention when compressive forces are applied to the rods 11 and 12: the yokes 11b and 12b of the forked portions of the rods 11 and 12 move towards each other and, with their respective prongs 11a and 11b, cause the plates 13 and 14 to move away from each other, tensioning the spring 15 which extends.

When tensile forces are applied to the rods 11 and 12, however, the yokes 11b and 12b of the forked portions of the rods move apart, moving the discs 13 and 14 apart and tensioning the spring 15 in this case also.

From the above, it is clear that, by virtue of the particular structure and conformation of the device according to the invention, the movement of the rods 11 and 12 both towards and away from each other causes tensioning of the spring 15 from its undeformed rest condition. In this condition, the spring may thus have its coils closed, that is, "packed" close together.

The connecting device according to the invention has considerable structural simplicity, as well as notable strength.

I claim:

1. A resilient device for connection between two relatively movable structural elements comprising:

two disks each having an aperture extending therethrough;

two rods, each extending through the aperture in a disk for axial sliding movement relative to the disk, adapted to be connected to one of the structural elements respectively; and at least one resilient member having opposite ends connected to the disk so as to oppose the movement of the rods apart from each other through the apertures in said disk;

wherein said rod, said disk and said resilient member form an assembly adapted to act as a rigid connection when the stresses applied to the connection are below a predetermined threshold and to deform resiliently when the stresses exceed the threshold so as to limit the amount of stress transmitted between the structural elements;

wherein sad rods are provided with respective first reaction means adapted to engage a respective disk to move the disks apart when the rods move toward each other and with respective second reaction means adapted to engage a respective disk to move the disks apart when the rods move apart so that the movement of the rods towards and away from each other causes the tensioning of the resilient member from an undeformed rest condition; and wherein portions of the rods extending within the resilient member are substantially in the shape of interpenetrating forks each having two prongs connected by yoke with the respective yokes being substantially spaced apart at rest whereby ends of the prongs of each fork engage opposed disks to move the disks apart upon movement of the rods towards each other and whereby the yokes of each rod engage adjacent disks respectively to move said disks apart upon movement of said rods apart from each other.

2. A device as set forth in claim 1, wherein each disk is provided with a plurality of peripheral grooves and said resilient member is a helical spring having opposite ends engaged in said grooves of said disks.

* * * * *

UNITED STATES PATENT AND TRADEMARK OFFICE
CERTIFICATE OF CORRECTION

PATENT NO. : 4,869,473

DATED : September 26, 1989

INVENTOR(S) : Domenico ANGELILLO

It is certified that error appears in the above-identified patent and that said Letters Patent is hereby corrected as shown below:

On the title page:

Item [19] In the heading, please delete "Giovanni", and insert --ANGELILLO--.

[75] Delete "Sesto S. Giovanni, Milan, Italy", and insert --Domenico Angelillo, Milan, Italy--.

Signed and Sealed this

Twelfth Day of March, 1991

Attest:

HARRY F. MANBECK, JR.

Attesting Officer

Commissioner of Patents and Trademarks